Aug. 24, 1937.          C. BREER ET AL          2,091,025
                      ELECTRIC SPEEDOMETER
                      Filed Nov. 17, 1934
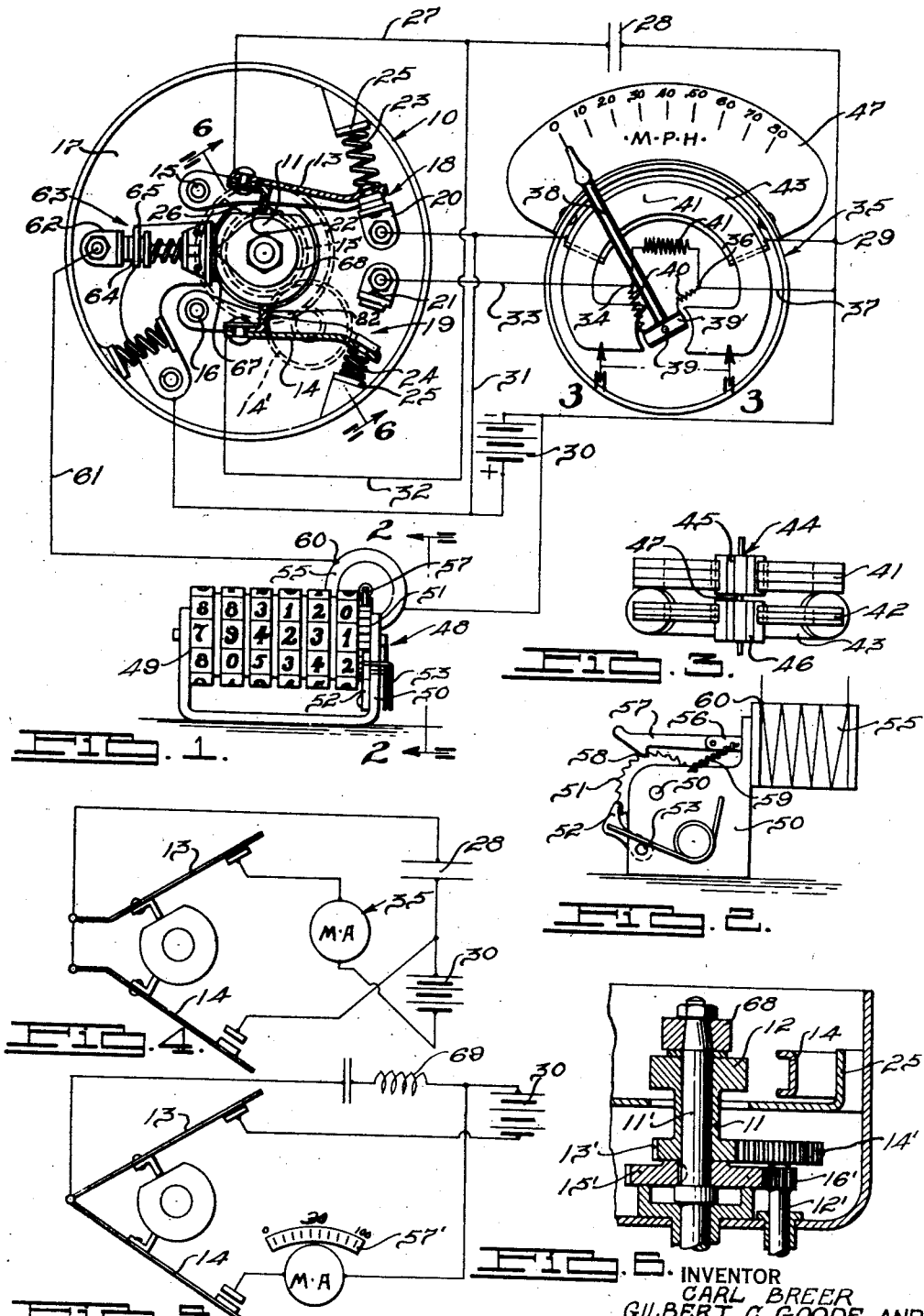
INVENTOR
CARL BREER
GILBERT C. GOODE AND
VERNON W. SHERMAN.
BY Hamess, Sund, Osterum Harris.
ATTORNEYS.

Patented Aug. 24, 1937

2,091,025

UNITED STATES PATENT OFFICE 2,091,025

ELECTRIC SPEEDOMETER

Carl Breer, Grosse Pointe Park, Gilbert C. Goode, Birmingham, and Vernon W. Sherman, Detroit, Mich., assignors to Chrysler Corporation, Detroit, Mich., a corporation of Delaware Application November 17, 1934, Serial No. 753,504

5 Claims. (Cl. 175—183)

This invention relates to an improved combined speedometer and odometer.

More particularly the invention pertains to electrically operable speed and distance indicating apparatus for vehicles.

One of the main objects of the invention is to provide a device of this character which has indicating instruments that are adapted to be actuated by apparatus disposed at a remote location therefrom without the aid of a rotative or otherwise movably operable driving connecting means between the instrument and the actuating apparatus.

Another object of the invention is to provide a speedometer of this character in which electrical instruments and devices of substantially standard and conventional types may be employed.

Further objects of the invention are to provide speed and distance indicating apparatus which require only simple wires for connecting them with their actuating apparatus; to provide a system of this kind in which a plurality of indicating instruments may be operated by the same actuating apparatus and located in diverse positions on a vehicle; to provide speed indicating apparatus which is fixed in adjustment and devoid of governor mechanism which, in practice, frequently becomes out of adjustment and requires repair and replacement.

Other objects of the invention are to provide means in a device of this kind for producing interruptions in an electric circuit at a rate proportional to the speed of travel of a vehicle; to provide means for registering the rate of occurrence of interruptions and the resulting effective current of a circuit in terms of speed of movement of a vehicle; to provide a condenser in a circuit of this kind which is adapted to be charged during each interval that the circuit is closed; to provide a separate branch circuit for the current measuring meter through which the condenser is discharged; to provide means for retaining this branch circuit open during charging of the condenser; to provide a device of this character in which the meter is, if desired, so electrically connected with the condenser and circuit interrupting means as to measure the rate of charging of the condenser and to indicate the same in terms of speed of travel of the vehicle.

A further object of the invention is to provide means for tuning the condenser circuit which enables the meter to be so calibrated as to spread out any selected part of the scale thereof more than the remaining portion and to thereby provide for accurate interpolation of the scale throughout a selected range.

Another object of the invention is to provide an improved magnetically operable odometer and circuit interrupting means therefor which is operable by mechanism including portions of the speedometer circuit interrupting apparatus.

Additional objects of the invention are to provide an improved milliammeter which is particularly adapted for use in conjunction with my improved speedometer; to provide a device of this kind which is not variable by fluctuations in voltage of a vehicle battery or other source of electric current with which it is connected; and to provide a compensating electro-magnetic element, in a milliammeter of this character, having a magnetic field which opposes the magnetic field of the permanent magnet of the meter in such a manner as to vary the effective magnetic field in accordance with variations in the voltage applied across the armature of the meter.

The above being among the objects of the present invention, the same consists in certain novel features of construction and combination of parts to be hereinafter described with reference to the accompanying drawing and then claimed, having the above and other objects in view.

Illustrative embodiments of the invention are shown in the accompanying drawing, in which:

Fig. 1 is an illustrative, schematic view of my improved combined speedometer and odometer showing portions of the apparatus in horizontal section and diagrammatically illustrating some of the electrical instruments and circuits thereof.

Fig. 2 is a side elevation showing the odometer as viewed from line II—II of Fig. 1.

Fig. 3 is a fragmentary lower end elevation showing the parts of the milliammeter disclosed in Fig. 1, as viewed from the line III—III of Fig. 1.

Fig. 4 is a diagrammatic, illustrational view of an electric speedometer, showing a wiring diagram therefor, and embodying a modified form of the invention.

Fig. 5 is a diagrammatic illustrational view of an electric speedometer and wiring diagram therefor which embodies a still further embodiment of the invention.

Fig. 6 is a vertical sectional view taken on line VI—VI of Fig. 1, and showing a driving connection for the apparatus.

The speed indicating and distance recording apparatus illustrated in the drawing is particularly suitable for vehicle installations. Either the speedometer or the odometer may, if desird, be employed independently of each other and either of these parts of the device are not limited in their use merely to employment in vehicles. The speedometer, for example, may be employed to indicate rotative or linear speeds of bodies of any character which have suitable rotative parts that may be operatively connected with the speedometer, and the odometer may likewise be used to ascertain the distance of travel of moving bodies other than vehicles.

In the form of the invention illustrated in Figs. 1, 2 and 3, the speedometer includes a casing 10 in which a tubular shaft 11 is concentrically and rotatably mounted. This shaft 11 may, in the case of an installation of the apparatus in a vehicle, be operatively connected with any selected moving part of the driving mechanism of a vehicle which rotates either in unison with or at a speed proportional to the road wheels of the vehicle. In practice, it will be convenient to mount the casing 10 on the transmission of a vehicle and to operatively connect the shaft 11 with one of the rotative parts 12' of the transmission, which is at all times in unison with or at a speed proportional to the propeller shaft of the vehicle, by meshed gears 13' and 14', the diameters of the latter being selected, if desired, to effect a predetermined reduction in the rotative speed of the shaft 11 with respect to the part 12' of the transmission.

Non-rotatably mounted on the shaft 11 is a cam 12 which operates movable contact arms 13 and 14 pivotally mounted at 15 and 16, respectively, to the end wall 17 of the casing 10. The contact arms 13 and 14 constitute the movable elements of circuit breakers, generally designated in Fig. 1 by the numerals 18 and 19, which include fixed contacts 20 and 21, respectively. Each of the movable contact arms carries a shoe 22 which bears upon the periphery of the cam 12 which preferably comprises non-conducting material such as fiber. These contact arms are normally urged toward contacting relationship with their associated fixed contact elements 20 and 21 by coil springs 23 and 24, respectively, which bear between the outer ends of the movable contact arms and upstanding flanges 25 struck out of the metal of the end wall 17 of the casing 10. The periphery of the cam 12 has only one flat face 26 which permits only one of the circuit breakers to be closed at any given instant.

The movable contact arm 13 of the circuit breaker 18 is electrically connected by a conductor 27 with a condenser 28 which is, in turn, electrically connected by a conductor 29 with the negative terminal of a battery 30, diagrammatically shown in the drawing for the purpose of illustrating a suitable source of electric current. In vehicle installations of the improved apparatus, the same battery which serves the lighting and ignition systems may be employed for this purpose. The positive terminal of the battery 30 is electrically connected by a conductor 31 with the stationary contact element 20 of the circuit breaker 18. The conductors 27, 29 and 31 connect the circuit breaker 18, condenser 28 and battery 30 in series in a circuit which serves to charge the condenser, when the cam 12 is in the position illustrated in Fig. 1 and accordingly when the circuit breaker 18 is closed.

The movable contact arm 14 of the circuit breaker 19 is electrically connected, by a conductor 32, with the conductor 27 at that portion of the latter which extends between the condenser and the movable contact arm 13. The fixed contact 21 of the circuit breaker 19 is electrically connected by a terminal 33 with one terminal 34 of a milliammeter, generally designated in Fig. 1 by the numeral 35. The other terminal 36 of the milliammeter is electrically connected by a conductor 37 with an intermediate portion of the conductor 29 which leads from the condenser 28 to the negative terminal of the battery 30.

The milliammeter 35, diagrammatically illustrated in Fig. 1, includes a pivotally mounted indicator 38 having an armature 39, provided with an armature coil 39', on its pivotally fixed ends electrically connected with the terminals 34 and 36 of the milliammeter by flexible conductors 40. Shunted across the terminals 34 and 36 is a resistance element 41 which limits the current applied on the armature. The armature 39 is embraced by adjacent pairs of poles of a permanent magnet 41 and an electro-magnet 42 which are so arranged as to bring their opposite poles into adjacent relationship, as illustrated in Fig. 3. The electro-magnet 42 is provided with a coil 43 which is electrically connected with the terminals 29 and 31 leading to the negative and positive terminals of the battery 30 respectively.

The armature 39 has a soft iron core generally designated by the numeral 44 in Fig. 3, which includes spaced end portions 45 and 46 that are connected together by an intermediate reduced section 47. The end section 45 registers with the poles of the permanent magnet 41 and the opposite end portion 46 of the core registers with the poles of the electro-magnet 42. The reduced intermediate section of the core of the armature reduces interference between the opposing fields of the two magnets.

The milliammeter is provided with a scale 47 graduated in terms of speed, such as for example, miles per hour. The effect of fluctuations in the battery voltage upon the armature of the milliammeter is compensated for by the influence such fluctuations have upon the resultant magnetic field of the two magnets.

As the voltage of the battery increases, the field of the electro-magnet is increased, and since this field opposes the permanent magnetic field, there is a reduction in the flux concentration to which the armature 39 is subjected which compensates for any increase in voltage applied on the armature coil 39' due to the increase in battery voltage. The effect of a decrease in the battery voltage is likewise compensated for in a reverse manner. Variation in battery voltage, therefore, has no effect whatsoever upon the calibration or reading of a milliammeter constructed in accordance with the foregoing description.

The milliammeter may be conveniently mounted on the instrument board of a vehicle and connected by simple wires with the circuit breaker apparatus which may be located adjacent any suitable rotative part of the driving mechanism of the vehicle. Thus, mechanically operable interconnecting devices such as the flexible cables of conventional speedometers are dispensed with.

In operation, the circuit breaker 18 is closed during a portion of the period the circuit breaker 19 is open. Each of the circuit breakers are opened and closed once during each rotation of the cam 12 and while the circuit breaker 18 is closed the condenser 28 is charged by the battery 30. When, however, the circuit breaker 18 is open and the circuit breaker 19 is closed, a condenser discharging circuit in which the milliammeter 35 is connected is completed through the conductors 32, 33 and 37. The rate of charging and discharging of the condenser 28 is proportional to the rotation of the cam 12 which is in turn proportional to the rate of rotation of the road wheels of a vehicle and to the forward movement thereof. The effective condenser discharge current applied on the milliammeter 35 is proportional to the rate of discharge of the condenser 28 and therefore the amplitude of movement of the indicator 38 over the scale 47 is proportional to the speed of travel of a vehicle. By connecting the milliammeter in the condenser discharge circuit, the meter is protected from injury by the current of the battery in the event of failure of the condenser.

The foregoing speed indicating apparatus is associated with an odometer, generally designated in Fig. 1 by the numeral 48, which includes a conventional odometer counter 49 having an operating shaft 50 on which a ratchet wheel 51 is non-rotatably mounted. The ratchet wheel 51 is held against counterclockwise rotation, as viewed in Fig. 2, by a detent 52 which is yieldably urged against the toothed periphery of the ratchet wheel by a spring 53. The counter, detent and spring are mounted on a frame structure 54 on which is supported an electro-magnet 55 preferably comprising a solenoid. Slidably mounted in the solenoid 55 is a plunger rod 56 having a lever 57 pivotally attached to its external end. Provided on the free end of the lever 57 is a tooth 58 which cooperates with the teeth of the ratchet wheel 51 in such a manner as to rotate the ratchet wheel a predetermined distance in a clockwise direction, as illustrated in Fig. 2, during each stroke of the plunger 56. The ratchet wheel 51 advances the counter-mechanism 49 a corresponding amount for each stroke of the plunger which is normally urged outwardly with respect to the solenoid by a spring 59.

One terminal 60 of the solenoid 55 is electrically connected by a conductor 61 with a fixed contact element 62 of a circuit breaker, generally designated in Fig. 1 by the numeral 63. The circuit breaker 63 includes a movable contact element 64 which is slidably mounted on a bracket 65 carried by the end wall 17 of the speedometer casing 10. The movable contact 64 is normally urged to the right, as viewed in Fig. 1, by a coil spring 66 and it has an abutment 67 which is engageable with a cam 68 mounted on a shaft 11' within the tubular shaft 11 and located adjacent the cam 12. The shaft 11' is operatively connected with the rotative part 12' of the transmission by suitable reduction gearing 15' and 16' by which it is driven at any desired rate with respect to the part 12', a speed reduction of one to four being satisfactory. The contact elements of the circuit breaker 63 are closed once during each rotation of the shaft 11, thereby energizing the solenoid 55 so as to advance the counter 49 a predetermined amount during that distance of the movement of the vehicle which corresponds to one rotation of the shaft 11.

The above odometer and speedometer may be used in conjunction with each other or independently if desired, and the counting mechanism may be located at any selected position on the instrument board of a vehicle or any portion thereof without requiring the use of mechanically operable driving connecting means such as the flexible shaft used in conjunction with vehicle speedometers and odometers of conventional construction.

In the form of the invention shown in Fig. 4, the main parts of the apparatus are substantially identical to those described above and corresponding parts are designated by identical numerals. The milliammeter 35 in this case is connected in series in the condenser charging circuit and it therefore measures the effective condenser charging current which is proportional to the rate of charge of the condenser 28.

In the form of the invention shown in Fig. 5, the apparatus is also substantially identical to that shown in Fig. 1 and corresponding parts and likewise designated by identical numerals. In this form of the invention, however, an inductance element 69 is connected in series in that portion of the condenser circuit which is common to the condenser charging and discharging circuits. This inductance is employed to tune the above circuits so as to produce a resonant circuit which substantially resonates with the frequency of the charging and discharging of the condenser when such frequency is at or near a selected value. In this manner, an increase in the effective condenser current is produced throughout that range of the rate of charging and discharging of the condenser which corresponds to the frequency range during which resonance occurs, and in this range the indicator of the milliammeter is moved through a greater distance per unit of increase of speed of the vehicle. This enables a selected range of the scale 57', illustrated in Fig. 5, to be spread out more than the remaining portion thereof. In the illustration shown, the portion of the scale corresponding to the range of from 0 to 30 miles per hour is illustrated as being spread out over substantially half the length of the scale, whereas the portion of the scale corresponding to the range of from 30 to 100 miles per hour extends only over the remaining half of the scale, thus enabling more accurate interpolation in the reading of the scale throughout a selected range thereof.

Although but several specific embodiments of our invention are shown, it is understood that various changes in the size, shape and arrangement of parts may be made without departing from the spirit of our invention, and it is not our intention to limit its scope other than by the terms of the appended claims.

We claim:

1. An electric speedometer including a member adapted to be rotated at a speed proportional to the movement of a body under examination, a condenser, a source of electrical current, a circuit connecting said electrical source and said condenser for charging the latter, and having an asymmetrically graduated scale, a branch circuit for discharging said condenser, a meter connected in one of said circuits and responsive to a characteristic thereof, means operable by said member for intermittently opening and closing said circuits to charge and discharge said condenser at a rate proportional to the speed of said body, and means connected with said condenser for tuning the circuit thereof so as to increase the energy stored therein during a predetermined range of speeds of said member and to accommodate spreading out of the graduations of said scale throughout a corresponding range thereof.

2. An electric speedometer including a member adapted to be rotated at a speed proportional to the movement of a body under examination, a condenser, a source of electrical current, a circuit connecting said electrical source and said condenser for charging the latter, a branch circuit having a portion common with said charging circuit for discharging said condenser, a milliammeter in said branch circuit having an asymmetrically graduated scale, means operable by said member for intermittently opening and closing said circuits to charge and discharge said condenser at a rate proportional to the speed of said body, and an inductance element connected in series with said condenser in the common portions of said circuits for tuning said portion of said circuit so that it will substantially resonate with the frequency of the discharging of said condenser when the value of such frequency is in a predetermined range.

3. In a vehicle including an engine and a circuit having an engine driven source of electrical energy characterized by a voltage varying at least under some of its operating conditions in response to changes of the speed of said engine, speedometer apparatus including, means for interrupting said circuit at a rate proportional to the speed of operation of a member of said vehicle under examination, a condenser in said circuit, and a milliammeter in said circuit responsive to the current thereof and calibrated to indicate the magnitude of said current in terms of speed of operation of said member, said milliammeter including a permanent magnet and an opposing electro-magnet having an energizing coil electrically connected with said source and adapted to compensate in the operation of said milliammeter for variations in the voltage of said source.

4. A current measuring instrument including a casing, a permanent magnet in said casing having spaced poles, an indicator pivotally mounted in said casing having an armature on its pivoted end disposed between said poles, an electro-magnet in said casing having poles adjacent poles of said permanent magnet, opposite poles of each of said magnets being disposed on the same sides of said armature respectively, and a circuit including a source of electrical current having a fluctuating voltage connected with said armature and with the coil of said electro-magnet, said electro-magnet being adapted to compensate in the resultant field of said magnets for variation in the voltage applied on said armature.

5. A current sensitive instrument including a movable wound armature, a permanent magnet, an electro-magnet including a magnetic core of low retentivity and a winding, both of said magnets being operative upon said armature but magnetically isolated from each other, a source of electrical energy, means for connecting a circuit under examination and energized by said source with the winding of said armature, and means for connecting the winding of said electro-magnet with said source.

CARL BREER.
GILBERT C. GOODE.
VERNON W. SHERMAN.